Figure 1:
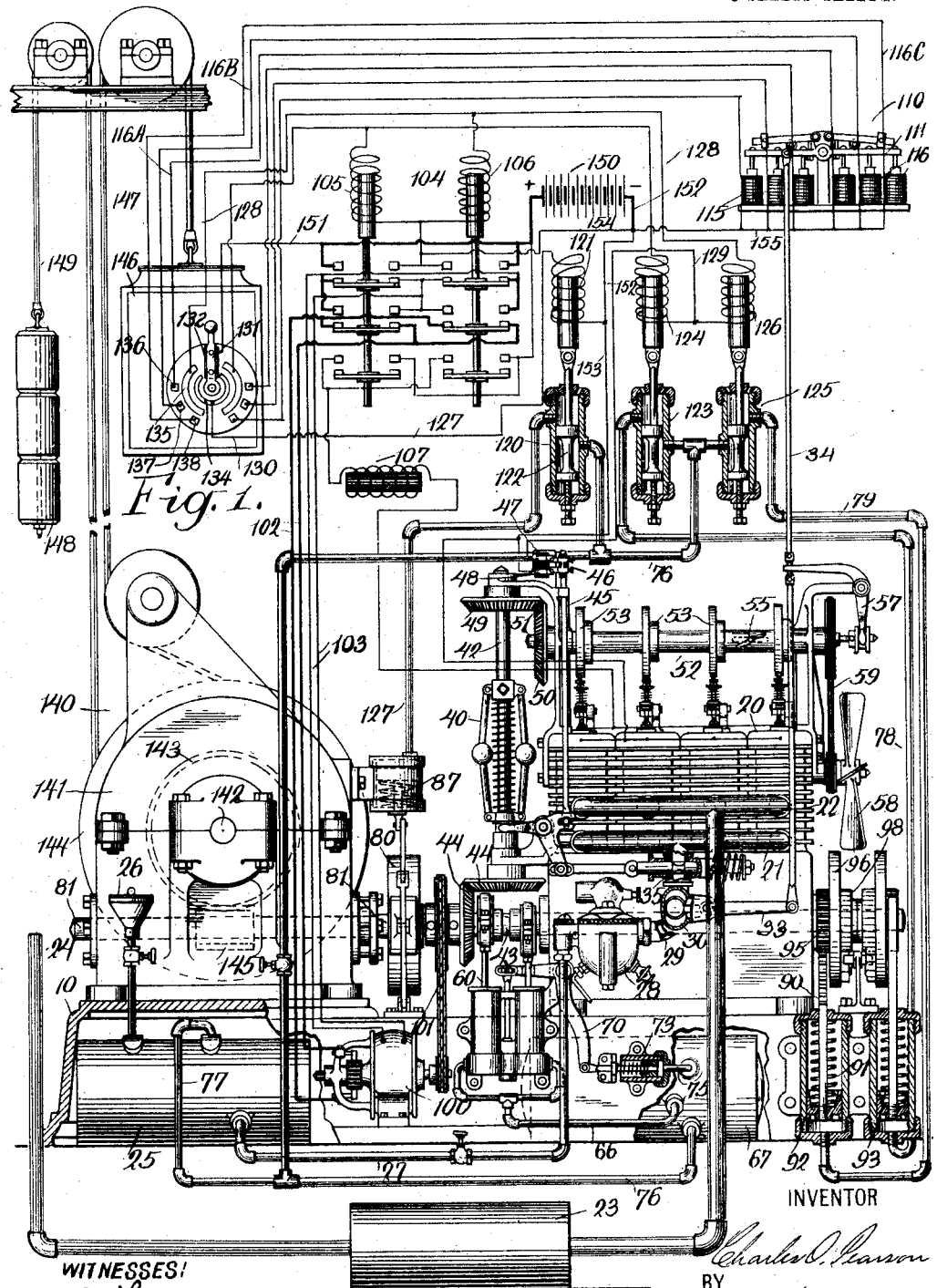

C. O. PEARSON.
DIRECT CONNECTED ELEVATOR.
APPLICATION FILED OCT. 12, 1908.

985,697.

Patented Feb. 28, 1911.

5 SHEETS—SHEET 1.

WITNESSES:

INVENTOR
Charles O. Pearson
BY
E. W. Marshall
ATTORNEY

C. O. PEARSON.
DIRECT CONNECTED ELEVATOR.
APPLICATION FILED OCT. 12, 1908.
985,697.
Patented Feb. 28, 1911.
5 SHEETS—SHEET 2.
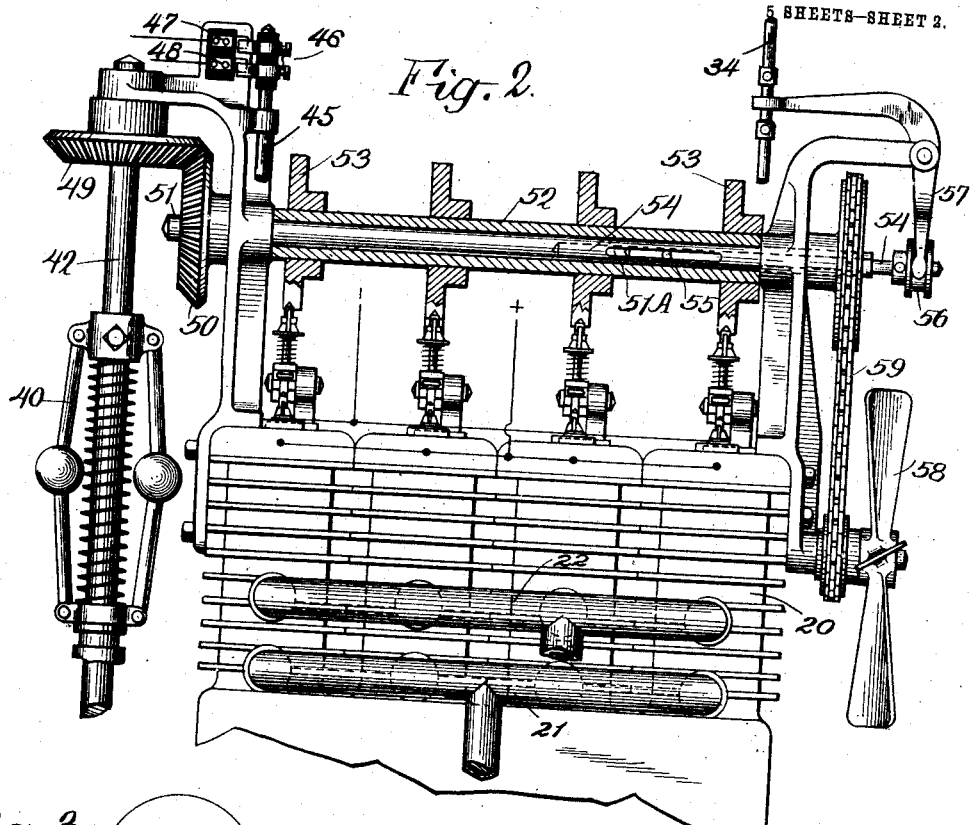
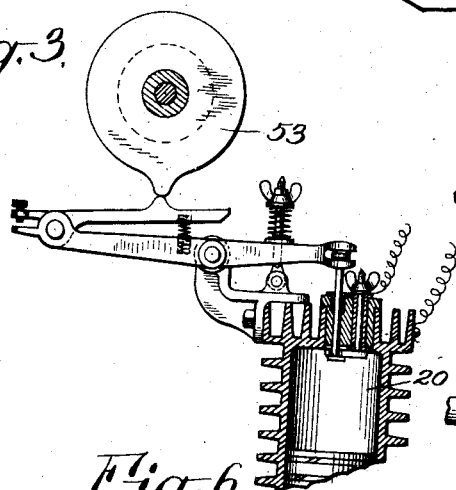
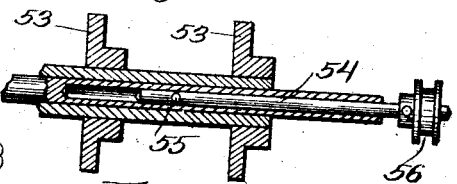
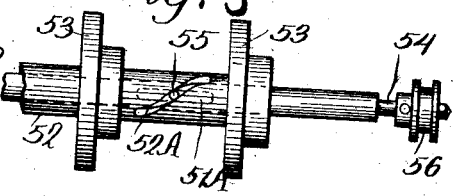
WITNESSES:
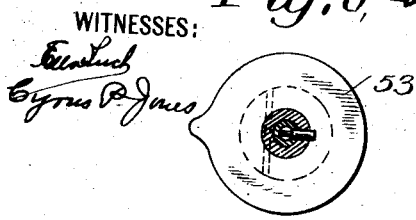
INVENTOR
Charles O. Pearson
BY
E. W. Marshall
ATTORNEY

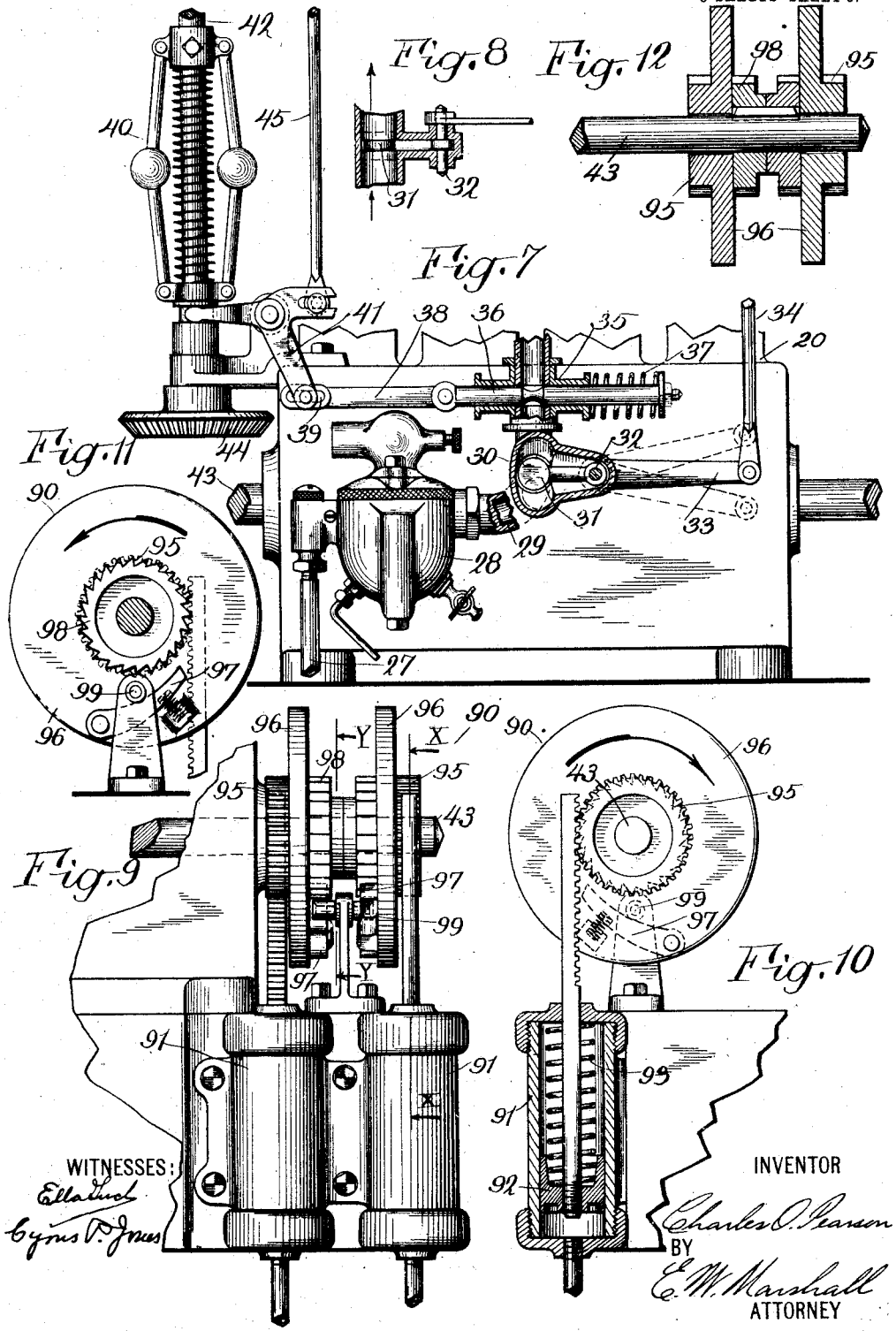

C. O. PEARSON.
DIRECT CONNECTED ELEVATOR.
APPLICATION FILED OCT. 12, 1908.
985,697.
Patented Feb. 28, 1911.
5 SHEETS—SHEET 4.
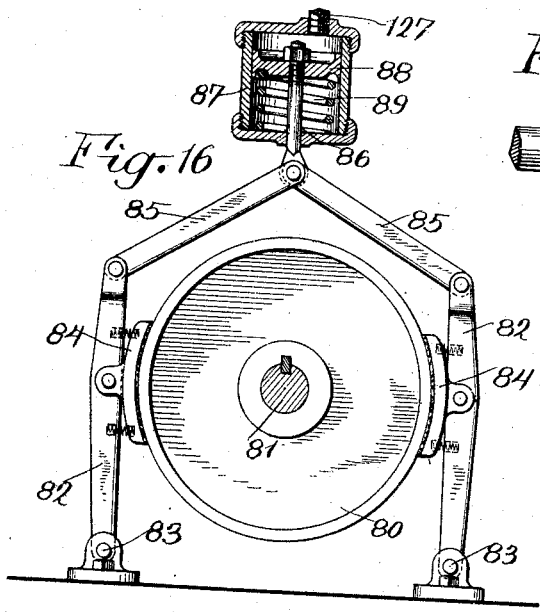
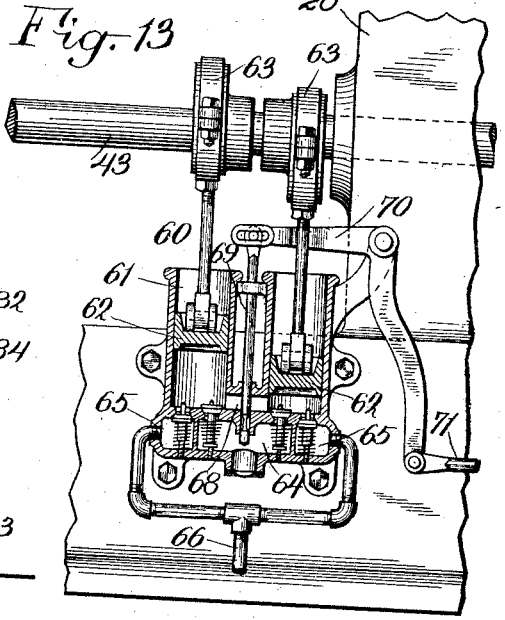
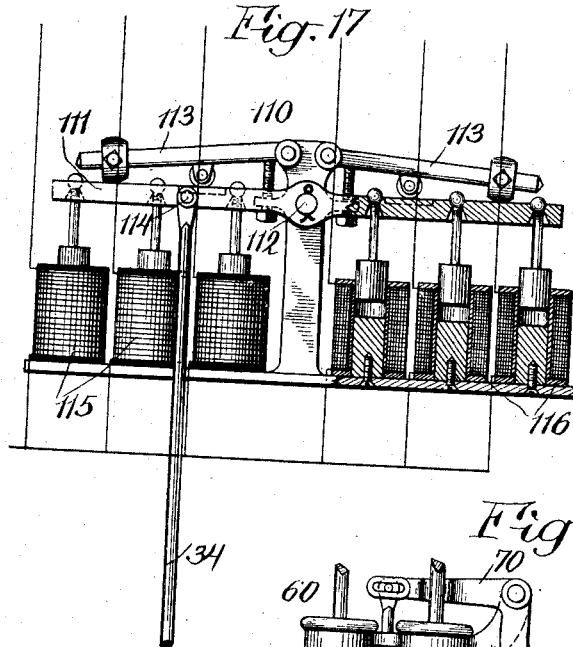
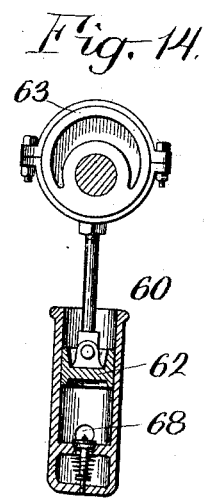
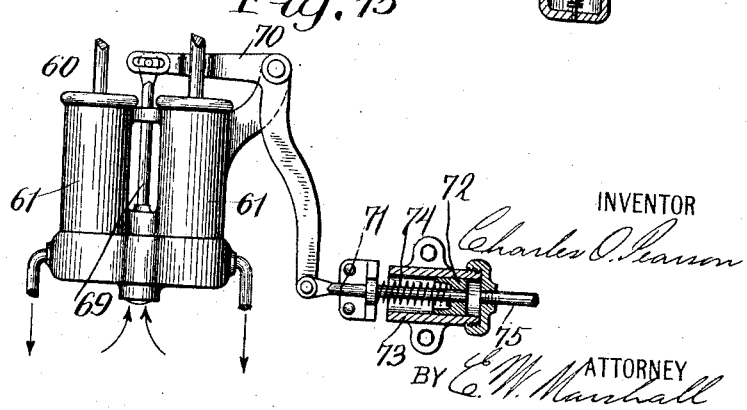
WITNESSES:
INVENTOR
Charles O. Pearson
BY E. W. Marshall
ATTORNEY

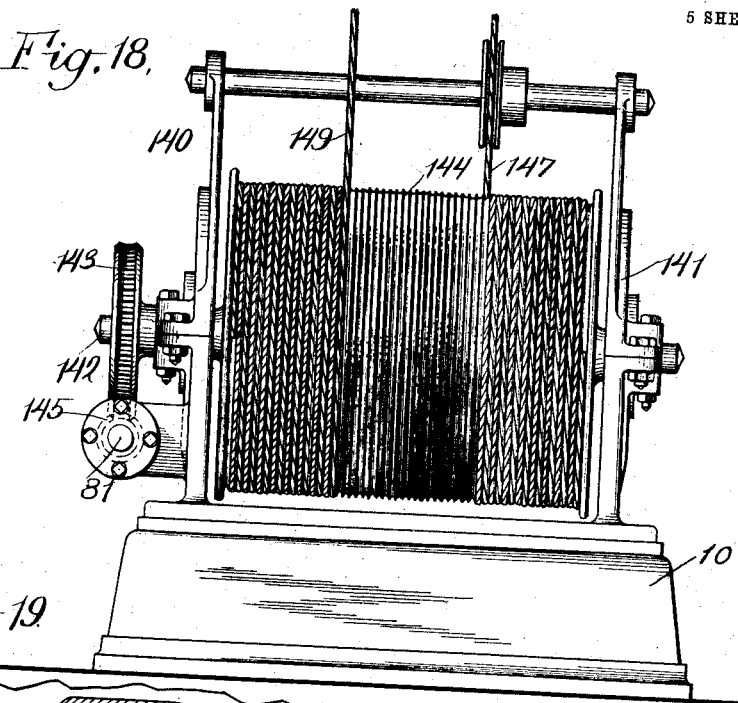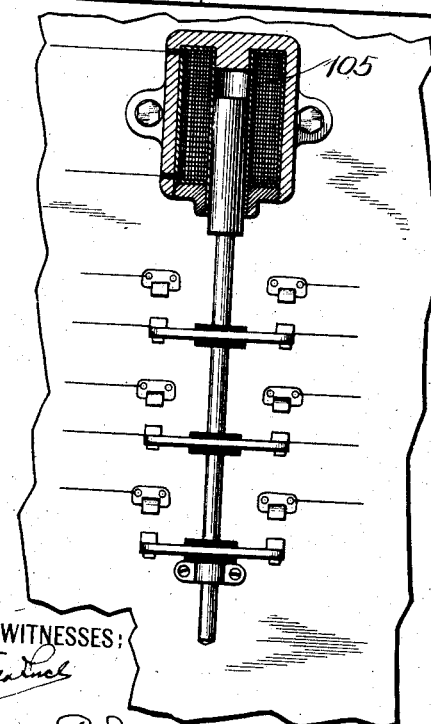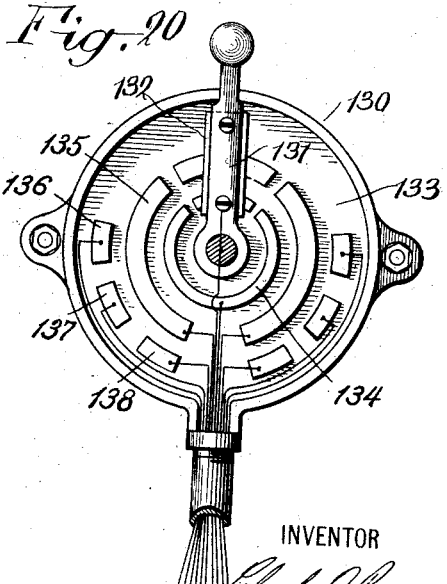

UNITED STATES PATENT OFFICE.

CHARLES O. PEARSON, OF NEW YORK, N. Y., ASSIGNOR TO OTIS ELEVATOR COMPANY, OF NEW YORK, N. Y., A CORPORATION OF NEW JERSEY.

DIRECT-CONNECTED ELEVATOR.

985,697.

Specification of Letters Patent. Patented Feb. 28, 1911.

Application filed October 12, 1908. Serial No. 457,347.

*To all whom it may concern:*

Be it known that I, CHARLES O. PEARSON, a citizen of the United States, and a resident of the borough of Brooklyn, in the city, county, and State of New York, United States of America, have invented certain new and useful Improvements in Direct-Connected Elevators, of which the following is a specification.

My invention relates to direct connected elevators, and its object is to provide an elevator apparatus in which an internal combustion engine is used as the motive power, together with a control system therefor which shall be energized by power generated by the engine itself.

Other objects of the invention will appear in the following specification, in which I will describe an elevator made according to my invention, and the novel features of which I will point out in the appended claims.

Referring to the drawings, Figure 1 is a side elevation, partly in section, of an elevator apparatus and an engine, together with associated mechanisms combined according to my invention. In this figure some of the parts are broken away to more clearly show the location of other of the parts. Fig. 2 is a side elevation of the upper portion of the engine and some of its connected mechanisms, and with a part of its sparking apparatus shown in section. In Fig. 3 an end view of a part of this sparking apparatus is shown with a portion of one of the engine cylinders drawn in section. Figs. 4 and 5 are a sectional plan and a side elevation of a portion of the sparking mechanism. Fig. 6 shows one of the sparking device cams in end elevation. Fig. 7 is a side elevation of a carbureter and its controlling valves together with a speed governor and other connected parts. Some of these parts are shown in section. Fig. 8 is a sectional plan view of one of these controlling valves. Fig. 9 is a side elevation of a fluid pressure starting device for the engine. Fig. 10 is a sectional end elevation of this starting device, the section being taken on the line X—X of Fig. 9. Fig. 11 is another sectional end elevation of this starting device, the section in this figure being taken on the line Y—Y of Fig. 9. Fig. 12 is a sectional side elevation of a pair of gears and other parts on the end of the engine shaft, which parts form a portion of the starting device. Fig. 13 is a sectional side elevation of a fluid pressure pump. Fig. 14 is a sectional end elevation of the fluid pressure pump. Fig. 15 is a side elevation of this pressure pump with its pressure regulator connected therewith and drawn in section. Fig. 16 is a sectional end elevation of a fluid pressure brake mechanism. Fig. 17 is a side elevation, partly in section, of an electrically-controlled governing mechanism which I use in conjunction with the other apparatus. Fig. 18 is an end elevation of a portion of the hoisting apparatus, showing the winding or hoisting drum. In Fig. 19 a portion of an electro-magnetically-actuated reversing switch is shown partly in section. Fig. 20 is a front elevation of a manually controlled car switch.

Like characters of reference designate corresponding parts in all of the figures.

10 designates a base-plate upon which a hoisting apparatus and an engine 20 and some of their associated parts are mounted. In this case the engine is shown as a four-cylinder two-cycle engine, but, of course, other forms and types of engines may be used if desired.

21 is the engine inlet; 22 its outlet or exhaust which, after passing through a muffler 23, may be led off by a pipe 24 to any desired point.

25 is a gasolene tank shown within the base 10.

26 is its filling inlet, and 27 a supply pipe leading from the tank to a carbureter 28.

29 is a pipe connection between the carbureter and the engine inlet 21.

30 is a throttle valve which is shown somewhat in detail in Figs. 7 and 8. It comprises a flat shutter 31 which is pivoted at 32 and arranged to be actuated by a lever 33 and a vertical connecting rod 34 to control the passage through this valve. In its central position, the shutter 31 partly closes the passage from the carbureter to the engine through the center of this valve, but opens this passage wider as it is moved away from this center to one side or the other. 35 is another throttle valve in this same passage which comprises a valve piston 36 with a spring 37 arranged to move it in one direction. One of its ends is connected by a link 38 with a pivoted bell-crank lever 41 by a lost motion connection 39.

40 is a centrifugal governor mounted upon a vertical shaft 42 which is driven from the engine shaft 43 through a pair of bevel gears 44, 44. The bell-crank lever is also connected by a rod 45 to actuate a switch 46 which is arranged to open an electric circuit between stationary contacts 47 and 48 whenever the speed of the engine has reached a predetermined rate.

A bevel gear 49 on the vertical shaft 42 is in mesh with a similar gear 50 on the end of a horizontal shaft 51 which is therefore driven thereby, and which is arranged to actuate the spark mechanism for the engine. 52 is a bushing upon shaft 51 which carries a plurality of cams 53 corresponding in number with the number of cylinders of the engine. One end of the shaft is drilled out for the reception of a slidable rod 54 which carries a pin 55. This pin projects through a straight slot 51A in the shaft 51, and a curved slot 52A in the bushing 52. A grooved collar 56 is affixed to the outer end of rod 54, and a pivoted lever 57 engages with this collar. By means of this lever the rod 54 may be moved into or out of the shaft 51, and by this movement and the engagement of pin 55 with slot 52A a collar 52 and its cams 53 may be rotated a limited amount upon the shaft 51 in one direction or the other for the purpose of advancing or retarding the spark mechanism of the engine. One form of spark mechanism is shown in Fig. 3, but I will not describe it herein as it is well known and forms no part of my invention.

The engine cylinders as herein shown are of the air-cooled type, and 58 designates a fan for creating an air circulation about these cylinders. The fan is arranged to be driven by a sprocket-chain 59 over a sprocket-wheel on the end of shaft 51.

60 is a fluid pressure pump which comprises a pair of cylinders 61 in which are pistons 62 driven by eccentric 63 on the engine shaft 43.

64 is an air inlet chamber from which are passages controlled by check valves leading into the lower ends of cylinders 61.

65, 65 are air outlet chambers into which are passages controlled by check valves from cylinders 61. A pipe 66 connects these passages with a pressure tank 67.

68 is a passage between the lower ends of the two cylinders 61. 69 is a piston valve which normally closes this passage, but which may be raised to open it. 70 is a bell-crank lever connected with the upper end of this piston valve. Its other end is connected by the rod 71 within a cylinder 73. 74 is a compression spring arranged to press this piston valve in. 75 is a pipe between the pressure tank 67 and the cylinder 73. These parts are so arranged that when the pressure in the tank reaches a predetermined amount the piston valve 69 will be raised thereby so that the passage 68 is opened. Air compressed in one of the cylinders 61 by the downward movement of its piston will then be free to pass into the other cylinder 61 while its piston is moved upward. Thus the work will be taken off of the pump and it will compress no more air or other fluid until the piston 69 again closes the passage 68, which will be done as soon as the pressure in tank 67 drops.

76 is a pressure supply pipe from the tank 67 to various parts of the apparatus which will be pointed out later. A branch pipe 77 from it leads to the gasolene tank 25 and supplies it with pressure.

In Fig. 16 a fluid-pressure-controlled brake device is shown. This comprises a brake sheave 80 rigidly mounted upon the engine shaft 43 or upon a shaft 81 which is in alinement therewith, or it may form a coupling for these two shafts.

82, 82 are brake levers which are pivoted to the base 10 at 83 and which carry a pair of brake shoes 84 which are arranged to bear against the periphery of the brake sheave 80. The outer ends of the brake levers are connected together by a pair of toggle levers 85. These are pivotally connected together and to a piston rod 86.

87 is a cylinder within which is a piston 88. A compression spring 89, acting against piston 88, is arranged to raise the piston, and, through the connections above described, to apply the brake. The brake may be released by admitting fluid pressure to the upper part of the cylinder 87 through a pipe 127.

90 designates a fluid pressure starting device for the engine. It comprises two cylinders 91 within which are pistons 92 which are pressed downward by springs 93. The upper ends of the piston rods are constructed to form toothed racks which are in mesh with gear-wheels 95, loosely mounted upon the engine shaft 43. One of these racks is on one side of one of the gears 95, and the other is on the opposite side of the other gear, so that the upward movement of one of the racks will drive its gear in one direction, while the upward movement of the other rack will drive its gear in the opposite direction. The inner portions of the gears 95 form flanges 96 on which are mounted pawls 97 which are spring-pressed inward to engage ratchet-wheels 98 when their gear is rotated, but which are held out of engagement with the ratchet-wheels by a stationary pin 99 when the pistons 92 are down. These ratchet-wheels are keyed or otherwise rigidly affixed to the engine shaft 43. When the fluid pressure is admitted to the bottom of one of the cylinders 91, it will push its toothed rack upward, and, through the mechanism above described, it will rotate the engine shaft in one direction. When the other rack is pushed upward, the engine will be driven in the opposite direction.

100 is an electrodynamic machine which is connected to run with the engine 20 by means of a sprocket-chain 101 running over sprocket-wheels on both the engine and armature shafts. 102 designates the leads from the armature of the electrodynamic machine, and 103 the leads from its field windings. These will thence run to various contacts of a reversing switch 104 which comprises two actuating magnets 105 and 106, together with other connected parts. One of these magnets and its connected parts are shown somewhat in detail in Fig. 19.

In Fig. 17 I have shown an electrically controlled governing device 110 which comprises an arm 111 pivoted at 112 and arranged to be held in central position by a pair of weighted arms 113. The vertical connecting rod 34 which is connected to the throttle valve lever 33 and with the spark-shifting lever 57, is pivotally attached to the arm 111 at 114.

115 designates a plurality of electromagnets or solenoids which are connected with the arm 111 at one side of its pivot, and 116 are other magnets connected with this arm at the other side of this pivot.

120 is an electrically controlled valve which comprises an electromagnet 121, the core of which is arranged to move a valve 122 whenever the magnet is energized, to open the passage between the pressure supply pipe 76 and the pipe 127 which leads to the brake actuating mechanism. 123 is a similar valve which, when its magnet 124 is energized, will connect pressure supply pipe 76 with one of the starting device cylinders 91 through pipe 78, and 125 and 126 are a valve and its connected controlling magnet which are arranged to admit fluid to the other starting device cylinder 91 through a pipe 79.

130 is a manually operated car switch which comprises a pivoted lever 131 carrying a movable contact 132 which is arranged to be moved onto the stationary contacts mounted upon an insulated base 133, which contacts I will point out in tracing the various circuits, and in describing the operation of the apparatus.

140 is an elevator hoisting apparatus mounted upon the base 10. It comprises a frame 141 which forms bearings for a shaft 142 upon which are rigidly mounted a gear-wheel 143 and a winding or hoisting drum 144. A worm-gear 145 on the shaft 81 is in mesh with the gear 143 and is so arranged that when the engine 20 is run in one direction or the other, it will cause the drum 144 to be rotated thereby.

146 designates an elevator-car which is connected with one side of the drum 144 by ropes or cables 147 run over suitable supporting and guiding sheaves.

148 is a counterweight connected with the other side of the drum 144 by ropes or cables 149.

150 is a storage battery, the two ends of which are designated by + and −. This battery is connected with the various parts of the apparatus by circuits which will now be traced.

151 is a conductor leading from one end of the battery to the contact plate 132 of the car switch. When an operator in the car turns the lever of this controlling switch in either direction, this contact 132 will be moved onto stationary contact 134 which, will close a circuit through conductor 127, through the winding of magnet 121, back to the battery by conductor 152. The valve 122 will then admit pressure from the pressure tank 67 to the cylinder 87 which will release the brake. If the operator turns the lever to the left, another circuit will be completed through contact 135 and conductor 128, through winding of magnet 126, and through conductor 129, to contact 47 of switch 46; through the switch and out by contact 48 and conductors 153 and 152, to the battery. This will cause the pressure tank to be connected through pipes 76 and 79 to one of the cylinders 91 of the starting device which will thereby be actuated and will rotate the engine shaft in one direction. This rotation of the engine shaft will cause the engine to draw in an explosive mixture which will be ignited by the spark mechanism which is connected through the reversing switch, and through a spark coil 107, with the battery. The engine will then run under its own power and will drive the centrifugal governor 40 which, through the connections previously described, will open the switch 46, thereby cutting off the electrical supply from magnet 126. The valve 125 will then be closed so that the fluid pressure starting device will no longer be supplied with fluid pressure, and its piston will be driven back by the spring 93 to its initial position. At the same time, a circuit will have been closed between contacts 132 and 135 of the car switch, conductor 128 through magnet 106 of the reversing switch, and back to the battery by conductor 154. This will cause the magnet 106 to be energized and to close the right-hand portion of the reversing switch 104, thereby connecting the armature leads of the electrodynamic machine and the leads from the field winding of the latter apparatus with the battery in such a direction as to cause it to rotate in the same direction as the rotation of the engine 20. The electrodynamic machine will then act as a motor and will drive the engine together with the movement which has been imparted thereto by the fluid pressure starting device 90. As soon, however, as the engine attains its normal speed, the electrodynamic machine will be driven thereby at a sufficient rate of speed to cause it to generate current back into battery 150 to thereby keep the battery charged. It may be seen from the circuits shown that the sparking devices on the engine cylinders will be connected through the reversing switch contacts, through the spark coil 107, with the battery. A further movement of the controlling switch lever will cause the contact 132 to be moved onto the stationary contact 136. This, through conductor 116ᴬ, will close a circuit through one of the magnets 116 which is connected by the return-wire 155 with the battery. This magnet 116 will move the pivoted lever 111 and the connecting rod 34 to advance the spark mechanism actuating cams to cause the engine to run faster. It will at the same time open the throttle valve 30 to further increase the speed of the engine. Similarly, contact 132 of the controlling car switch may be moved onto stationary contact 137 which will then close a circuit through conductor 116ᴮ through the second magnet 116, to move the pivoted arm 111 a further amount to further increase the speed of the engine. When the controlling switch is moved to its extreme position to the left, a circuit will be closed through the contacts 132 and 138, through conductor 116ᶜ, to close a circuit through the third magnet 116, which, through the mechanical connections above pointed out, will further advance the spark mechanism and will fully open throttle valve 30. The engine will now attain its full speed which will be controlled by the centrifugal governor 40. This is so arranged that whenever the engine attains undue speed it will close the throttle valve 35 to prevent racing of the engine. The controlling switch 130 is placed in the elevator-car 146. The rotation of the engine obtained in the manner above described will cause the car to be driven up or down, as the case may be. Thus, an operator in the car may start up the engine to start the car in one direction and cause this movement to be accelerated at will. The operator may at any time move the lever of the controlling switch back off of contacts 138, 137, or 136 to deënergize any of the magnets 116, and may thus reduce the speed of the engine and of the car by shifting the sparking mechanism and closing the throttle valve 30, or he may stop the engine and bring the car to rest by moving the car-switch lever back to its central position, when the valve 120 will be closed, the ignition current cut off, and the brake applied. If the operator desires to start the engine and the car in the opposite direction, he may turn the car-switch lever 131 to the right, when operations similar to those above specifically described will take place, but in this case the electrodynamic machine's leads will be connected to the battery in such a direction as to cause it to rotate in the opposite direction, and the other cylinder 91 of the fluid pressure starting device will be supplied with fluid pressure through the valve 123 and pipe 78, so that these two mechanisms will drive the engine, and consequently the car, in the opposite direction. The speed at which the car is run then may be controlled through the magnets 115 of the electrically controlled governing mechanism 110, which magnets are controlled by suitable contacts in the controlling switch.

By means of the apparatus above described, a simple and positive control for an elevator driven by an internal combustion engine is provided. The engine itself is directly connected with the elevator apparatus and both the fluid pressure supply and electrical energy which are used for stopping and starting the engine, and the apparatus and the engine which it drives are generated by the engine itself. This invention, therefore, opens up a new field for the use of internal combustion engines which have not hitherto been applied to drive elevators, except through intermediate mechanisms, such, for example, as a continuously driven shaft connected with the elevator hoisting mechanism through clutches. This is partly because engines of this type have been difficult to start and control. But the simple arrangement which I have herein disclosed overcomes these difficulties and provides a means for starting the engine in either direction, and a suitable means for controlling its speed and bringing it to rest at will. Moreover, all of these operations may be controlled by a simple manually operated switch in the car.

The power generating device is complete in itself and is directly connected with a hoisting apparatus. In other words, the motive power is the engine which produces its own power and does not merely transform one form of energy into another as is the case where steam engines or electric motors are used.

What I claim is,—

1. An elevator hoisting apparatus, an internal combustion engine directly connected therewith, devices driven by the engine for generating two different supplies of energy, and means energized by said supplies of energy and arranged to control said engine and apparatus.

2. An elevator hoisting apparatus, an internal combustion engine directly connected therewith, devices driven by the engine for generating two different supplies of energy, storage means therefor, and means energized by both of said supplies for starting and controlling the action of said apparatus.

3. An elevator hoisting apparatus, an internal combustion engine directly connected therewith, devices driven by the engine for generating a fluid pressure supply and an electrical supply, storage means for both of said supplies, and means energized by said supplies and arranged to start the engine and to control the speed thereof.

4. An elevator hoisting apparatus, an internal combustion engine directly connected therewith, means driven thereby for generating a supply of fluid pressure, other means driven by the engine for generating a supply of electrical energy, and combined fluid pressure and electrical system for controlling the engine and apparatus, said control system being actuated by both of said supplies.

5. An elevator hoisting apparatus, an internal combustion engine directly connected therewith, means driven thereby for generating a supply of fluid pressure, other means driven by the engine for generating a supply of electrical energy, a brake for the apparatus, and a combined fluid pressure and electrical system for controlling the engine, said system being arranged to be actuated by both of said supplies, and comprising means for actuating the brake by the fluid supply.

6. An elevator hoisting apparatus, an internal combustion engine directly connected therewith, a pressure pump connected with the engine and arranged to generate a fluid pressure supply, an electrodynamic machine connected with the engine and arranged to generate a supply of electrical energy, storage means for both of said supplies, a fluid pressure starting device for the engine, and electromagnetic means for connecting the fluid pressure supply with the starting device, said electromagnetic means being controlled by the electrical supply.

7. An elevator hoisting apparatus, an internal combustion engine directly connected therewith, a pressure pump connected with the engine and arranged to generate a fluid pressure supply, an electrodynamic machine connected with the engine and arranged to generate a supply of electrical energy, storage means for both of said supplies, a fluid pressure starting device for the engine, said electrodynamic machine being arranged to run as a motor to start the engine, means for connecting the fluid pressure supply with the starting device, means for connecting the electrical supply with the electrodynamic machine, and means for controlling both of said supplies.

8. An elevator hoisting apparatus, an internal combustion engine directly connected therewith, a pressure pump connected with the engine and arranged to generate a fluid pressure supply, an electrodynamic machine connected with the engine and arranged to generate a supply of electrical energy, storage means for both of said supplies, a fluid pressure starting device for the engine, a valve for connecting the fluid pressure supply with the starting device, an actuating device for said valve actuated by the electrical supply, manual means for controlling said valve actuating device, and automatic means whereby said valve is closed when the engine reaches a predetermined speed.

9. An elevator hoisting apparatus, an internal combustion engine directly connected therewith, a pressure pump connected with the engine and arranged to generate a fluid pressure supply, an electrodynamic machine connected with the engine and arranged to generate a supply of electrical energy, storage means for both of said supplies, a fluid pressure starting device for the engine, an electromagnetically actuated valve for connecting the fluid pressure supply with the starting device, said valve being energized by the electrical supply, and a centrifugal governor arranged to control the speed of the engine, and to automatically cause said valve to close when the engine reaches a predetermined speed.

10. An elevator hoisting apparatus, an internal combustion engine directly connected therewith, a pressure pump connected with the engine and arranged to generate a fluid pressure supply, an electrodynamic machine connected with the engine and arranged to generate a supply of electrical energy, said fluid pressure supply being arranged to force a fuel supply to the engine, a speed controlling valve for controlling the admission of the fuel supply to the engine, and an actuator for the speed controlling valve, said actuator being energized by the electrical supply.

11. An elevator hoisting apparatus, an internal combustion engine directly connected therewith, a pressure pump connected with the engine and arranged to generate a fluid pressure supply, an electrodynamic machine connected with the engine and arranged to generate a supply of electrical energy, a sparking device for the engine, an electromagnetic actuator energized by the electrical supply for shifting the sparking device to control the speed of the engine, and manual means for controlling said actuator.

12. An elevator hoisting apparatus, an internal combustion engine directly connected therewith, a pressure pump connected with the engine and arranged to generate a fluid pressure supply, an electrodynamic machine connected with the engine and arranged to generate a supply of electrical energy, a sparking device for the engine, a speed controlling valve for the engine, and an electromagnetic actuator for shifting the sparking device and actuating the speed controlling valve to control the speed of the engine.

13. An elevator hoisting apparatus, an internal combustion engine directly connected therewith, a pressure pump connected with the engine and arranged to generate a fluid pressure supply, an electrodynamic machine connected with the engine and arranged to generate a supply of electrical energy, storage means for both of said supplies, a brake for the hoisting apparatus, means actuated by the fluid pressure supply for operating said brake, and means actuated by the electrical supply for controlling the pressure operating device.

14. An elevator hoisting apparatus, an internal combustion engine directly connected therewith, a pressure pump connected with the engine and arranged to generate a fluid pressure supply, an electrodynamic machine connected with the engine and arranged to generate a supply of electrical energy, storage means for both of said supplies, a fluid pressure starting device for the engine, a reversing switch arranged to connect said electrical supply with the electrodynamic machine, and to cause said supply to run said electrodynamic machine in either direction as a motor.

15. An elevator hoisting apparatus, an internal combustion engine directly connected therewith, a pressure pump connected with the engine and arranged to generate a fluid pressure supply, an electrodynamic machine connected with the engine and arranged to generate a supply of electrical energy, storage means for both of said supplies, a fluid pressure starting device for the engine, an electromagnetic device for connecting the pressure supply with the starting device, a reversing switch arranged to connect said electrical supply with the electrodynamic machine to cause said supply to run the electrodynamic machine in either direction as a motor, and means for causing said reversing switch and the electromagnetic device to be simultaneously actuated.

16. An elevator hoisting apparatus, an internal combustion engine directly connected therewith, a pressure pump connected with the engine and arranged to generate a fluid pressure supply, an electrodynamic machine connected with the engine and arranged to generate a supply of electrical energy, storage means for both of said supplies, a fluid pressure starting device for the engine, an electromagnetic device for connecting the pressure supply with the starting device, a sparking device for the engine, a reversing switch arranged to connect the electrical supply with the electrodynamic machine to cause said supply to run the electrodynamic machine in either direction as a motor, said reversing switch being also arranged to control the sparking device, and means for causing the reversing switch and the electromagnetic device to be simultaneously actuated.

17. An elevator hoisting apparatus, an internal combustion engine directly connected therewith, a pressure pump connected with the engine and arranged to generate a fluid pressure supply, a pressure tank, an electrodynamic machine connected with the engine and arranged to generate a supply of electrical energy, a battery for storing said electrical energy, a fluid pressure controlling device for the engine, an electromagnetic device for connecting the pressure tank with the starting device, a sparking device for the engine, a reversing switch arranged to connect the battery with the electrodynamic machine to cause said electrical supply to run the electrodynamic machine in either direction as a motor, said reversing switch being also arranged to control the circuits for the sparking device, and means for causing the reversing switch and the electromagnetic device to be simultaneously actuated.

18. An elevator hoisting apparatus, an internal combustion engine directly connected therewith, an elevator-car, a fluid pressure supply generated by the engine and an electrical supply, storage means for both of said supplies, means actuated by both of said supplies for starting the engine and for controlling the speed thereof, and means for manually controlling said supplies from the car.

19. An elevator hoisting apparatus, an internal combustion engine directly connected therewith, an elevator-car, a fluid pressure supply generated by the engine and an electrical supply, storage means for both of said supplies, means actuated by both of said supplies for starting the engine in either direction and for controlling the speed thereof; and a manually operated switch in the car connected directly with one of said supplies and arranged to control both of said supplies.

20. An elevator hoisting apparatus, an internal combustion engine directly connected therewith, an elevator-car, means driven by the engine for generating a supply of fluid pressure, other means driven by the engine for generating a supply of electrical energy, storage means for both of said supplies, both of said supplies being arranged to start the engine and the car in either direction, a control system for the engine, said control system being actuated by both of said supplies, and a manually operated switch in the car for controlling said supplies.

21. An elevator hoisting apparatus, an internal combustion engine directly connected therewith, an elevator-car, a pressure pump connected with the engine and arranged to generate a fluid pressure supply, an electrodynamic machine connected with the engine and arranged to generate a supply of electrical energy, storage means for both of said supplies, a fluid pressure starting device for the engine, an electromagnetically actuated valve for connecting the fluid pressure supply with the starting device, said valve being actuated by the electrical supply, and a manually operated switch in the car for controlling said valve.

22. An elevator hoisting apparatus, an internal combustion engine directly connected therewith, an elevator-car, a pressure pump connected with the engine and arranged to generate a fluid pressure supply, an electrodynamic machine connected with the engine and arranged to generate a supply of electrical energy, storage means for both of said supplies, a fluid pressure starting device for the engine comprising a cylinder and connecting mechanism for starting the engine in one direction, and a cylinder and connecting mechanism for starting the engine in the opposite direction, and means for rendering one of said connecting mechanisms inoperative while the other of said mechanisms is used, an electromagnetically actuated valve for connecting the fluid pressure supply with the starting device, said valve being actuated by the electrical supply, and a manually operated switch in the car for controlling said valve.

23. An elevator hoisting apparatus, an internal combustion engine directly connected therewith, an elevator-car, a pressure pump connected with the engine and arranged to generate a fluid pressure supply, an electrodynamic machine connected with the engine and arranged to generate a supply of electrical energy, storage means for both of said supplies, a fluid pressure starting device for the engine, said electrodynamic machine being arranged to be run as a motor to start the engine, and to assist the engine in driving the car, a valve for connecting the fluid pressure supply with the starting device, a switch for connecting the electrical supply with the electrodynamic machine to start the engine in either direction, and a manually operated switch in the car for controlling both of said supplies.

24. An elevator hoisting apparatus, an internal combustion engine directly connected therewith, an elevator-car, a pressure pump connected with the engine and arranged to generate a fluid pressure supply, an electrodynamic machine connected with the engine and arranged to generate a supply of electrical energy, storage means for both of said supplies, a fluid pressure starting device for the engine, an electromagnetically actuated valve for connecting the fluid pressure supply with the starting device, said valve being energized by the electrical supply, a manually operated switch in the car for controlling said valve, and a switch arranged to be actuated by the engine for automatically deënergizing said electromagnetic valve and thereby disconnecting the starting device when the engine reaches a predetermined speed.

25. An elevator hoisting apparatus, an internal combustion engine directly connected therewith, an elevator-car, a pressure pump connected with the engine and arranged to generate a fluid pressure supply, an electrodynamic machine connected with the engine and arranged to generate a supply of electrical energy, storage means for both of said supplies, a fluid pressure starting device for the engine, an electromagnetically actuated valve for connecting the fluid pressure supply with the starting device, said valve being energized by the electrical supply, a manually operated electric switch in the car for controlling said connecting valve, a throttle valve for the engine, and a centrifugal governor arranged to actuate the throttle valve to control the speed of the engine and to deënergize said electromagnetic connecting valve when the engine reaches a predetermined speed.

26. An elevator hoisting apparatus, an internal combustion engine directly connected therewith, an elevator-car, a pressure pump connected with the engine and arranged to generate a fluid pressure supply, an electrodynamic machine connected with the engine and arranged to generate a supply of electrical energy, said fluid pressure supply being arranged to force a fuel supply to the engine, a speed controlling valve for controlling the admission of the fuel supply to the engine, an electromagnetic actuator for moving the speed controlling valve, step by step, said actuator being energized from the electrical supply, and a manually operated switch in the car for controlling said actuator.

27. An elevator hoisting apparatus, an internal combustion engine directly connected therewith, an elevator-car, a pressure pump connected with the engine and arranged to generate a fluid pressure supply, an electrodynamic machine connected with the engine and arranged to generate a supply of electrical energy, a sparking device for the engine, a speed controlling valve for the engine, an electromagnetic actuator energized from the electrical supply for shifting the sparking device and moving the speed controlling valve step by step to control the speed of the engine, and a manually operated switch in the car for controlling said actuator.

28. An elevator hoisting apparatus, an internal combustion engine directly connected therewith, an elevator-car, a pressure pump connected with the engine and arranged to generate a fluid pressure supply, an electrodynamic machine connected with the engine and arranged to generate a supply of electrical energy, a sparking device for the engine, a throttle valve, a centrifugal governor arranged to control the throttle valve, a speed controlling valve for the engine, an electromagnetic actuator energized from the electrical supply for shifting the sparking device and moving the speed controlling valve step by step to control the speed of the engine, and a manually operated switch in the car for controlling said actuator.

29. An elevator hoisting apparatus, an internal combustion engine directly connected therewith, an elevator-car, a pressure pump connected with the engine and arranged to generate a fluid pressure supply, an electrodynamic machine connected with the engine and arranged to generate a supply of electrical energy, storage means for both of said supplies, a brake for the hoisting apparatus, means actuated by the pressure supply for controling the brake, means energized by the electrical supply for controlling said pressure supply controlling means, and manual means in the car for controlling said electrical controlling means.

30. An elevator hoisting apparatus, an internal combustion engine directly connected therewith, an elevator-car, a pressure pump connected with the engine and arranged to generate a fluid pressure supply, an electrodynamic machine connected with the engine and arranged to generate a supply of electrical energy, storage means for both of said supplies, a fluid pressure starting device for the engine, an electromagnetically actuated valve for connecting the fluid pressure supply with the starting device to cause the starting device to run the engine in one direction, another electromagnetically actuated valve for connecting the pressure supply with the starting device to cause the starting device to run the engine in the opposite direction, a brake for the hoisting apparatus, an electromagnetically actuated valve for controlling the brake, all of said valves being actuated by the electrical supply, and a manually operated electric switch in the car for controlling said valves.

31. An elevator hoisting apparatus, an internal combustion engine directly connected therewith, an elevator-car, a pressure pump connected with the engine and arranged to generate a fluid pressure supply, an electrodynamic machine connected with the engine and arranged to generate a supply of electrical energy, storage means for both of said supplies, a fluid pressure starting device for the engine, an electromagnetically actuated valve for connecting the fluid pressure supply with the starting device to cause the starting device to run the engine in one direction, another electromagnetically actuated valve for connecting the pressure supply with the starting device to cause the starting device to run the engine in the opposite direction, a brake for the hoisting apparatus, an electromagnetically actuated valve for controlling the brake, all of said valves being actuated by the electrical supply, a centrifugal governor driven by the engine and arranged to break the circuits to said starting device valves to automatically close said valves when the engine and car reach a predetermined speed, and a manually operated electric switch in the car for controlling said valves.

32. An elevator hoisting apparatus, an internal combustion engine directly connected therewith, an elevator-car, a pressure pump connected with the engine and arranged to generate a fluid pressure supply, an electrodynamic machine connected with the engine and arranged to generate a supply of electrical energy, storage means for both of said supplies, a fluid pressure starting device for the engine, said electrodynamic machine being arranged to start the engine in either direction and to assist the engine in driving the car, an electromagnetically actuated valve for connecting the fluid pressure supply with the starting device to cause the starting device to run the engine in one direction, another electromagnetically actuated valve for connecting the fluid pressure supply with the starting device to cause the starting device to run the engine in the opposite direction, circuits for said valves, a reversing switch for connecting the electrical supply with the electrodynamic machine, and a manually operated electric switch in the car for controlling said valves and said reversing switch.

33. An elevator hoisting apparatus, an internal combustion engine directly connected therewith, an elevator-car, a pressure pump connected with the engine and arranged to generate a fluid pressure supply, an electrodynamic machine connected with the engine and arranged to generate a supply of electrical energy, storage means for both of said supplies, a reversible fluid pressure starting device for the engine, a throttle valve for the engine, a centrifugal governor arranged to control said throttle valve, said electrodynamic machine being arranged to start the engine in either direction and to assist the engine in driving the car, an electromagnetically actuated valve for connecting the fluid pressure supply with the starting device to cause the starting device to run the engine in one direction, another electromagnetically actuated valve for connecting the fluid pressure supply with the starting device to cause said starting device to run the engine in the opposite direction, said starting devices being also arranged to assist the engine in driving the car, a sparking device for the engine, circuits for said valves, a reversing switch arranged to connect the electrical supply with the electrodynamic machine, and to control the electrical supply to the sparking device, an electromagnetic actuator for controlling the speed of the engine, said centrifugal governor being arranged to break the circuits to said starting device valves to automatically cut off the pressure supply from said starting device when the engine and the car have reached a predetermined speed, and a manually operated electric switch in the car for controlling said valves, said reversing switch, and said actuator.

In testimony whereof I have signed my name to this specification in the presence of two subscribing witnesses.

CHARLES O. PEARSON.

Witnesses:
ELLA TUCH,
ERNEST W. MARSHALL.

---

Copies of this patent may be obtained for five cents each, by addressing the "Commissioner of Patents, Washington, D. C."